US012737528B2

(12) United States Patent
Liu et al.

(10) Patent No.: US 12,737,528 B2
(45) Date of Patent: Sep. 15, 2026

(54) VECTOR FONT GENERATION BASED ON CASCADED DIFFUSION

(71) Applicant: Adobe Inc., San Jose, CA (US)

(72) Inventors: Difan Liu, Amhert, MA (US); Matthew David Fisher, Burlingame, CA (US); Michaël Yanis Gharbi, San Francisco, CA (US); Oliver Wang, Seattle, WA (US); Alec Stefan Jacobson, Toronto (CA); Vikas Thamizharasan, Amherst, MA (US); Evangelos Kalogerakis, Sunderland, MD (US)

(73) Assignee: Adobe Inc., San Jose, CA (US)

( * ) Notice: Subject to any disclaimer, the term of this patent is extended or adjusted under 35 U.S.C. 154(b) by 520 days.

(21) Appl. No.: 18/507,847

(22) Filed: Nov. 13, 2023

(65) Prior Publication Data

US 2025/0124212 A1 Apr. 17, 2025

(30) Foreign Application Priority Data

Oct. 11, 2023 (GR) .............................. 20230100834

(51) Int. Cl.
*G06F 40/109* (2020.01)
*G06T 11/23* (2026.01)
*G06T 11/40* (2006.01)

(52) U.S. Cl.
CPC ............ *G06F 40/109* (2020.01); *G06T 11/23* (2026.01); *G06T 11/40* (2013.01)

(58) Field of Classification Search
None
See application file for complete search history.

(56) References Cited

U.S. PATENT DOCUMENTS

2009/0297030 A1* 12/2009 Oota .......................... G06T 9/20 382/243
2011/0007334 A1* 1/2011 Fan ....................... G06V 30/168 358/1.11
2025/0078343 A1* 3/2025 Chen ..................... G06F 40/109

OTHER PUBLICATIONS

Azadi, Samaneh , et al., "Multi-Content GAN for Few-Shot Font Style Transfer", Proceedings of the IEEE Conference on Computer Vision and Pattern Recognition (CVPR) [retrieved Mar. 8-9, 2023]. Retrieved from the Internet <https://openaccess.thecvf.com/content_cvpr_2018/papers/Azadi_Multi-Content_GAN_for_CVPR_2018_paper.pdf>., Dec. 1, 2017, 10 pages.

(Continued)

*Primary Examiner* — Jeffrey J Chow
(74) *Attorney, Agent, or Firm* — FIG. 1 Patents

(57) ABSTRACT

In implementation of techniques for vector font generation based on cascaded diffusion, a computing device implements a glyph generation system to receive a sample glyph in a target font and a target glyph identifier. The glyph generation system generates a rasterized glyph in the target font using a raster diffusion model based on the sample glyph and the target glyph identifier, the rasterized glyph having a first level of resolution. The glyph generation system then generates a vector glyph using a vector diffusion model by vectorizing the rasterized glyph, the vector glyph having a second level of resolution different than the first level of resolution. The glyph generation system then displays the vector glyph in a user interface.

20 Claims, 11 Drawing Sheets

(56) References Cited

OTHER PUBLICATIONS

Balaji, Yogesh , et al., “ediffi: Textto-image diffusion models with an ensemble of expert denoisers”, Cornell University arXiv, arXiv.org [retrieved Aug. 9, 2023]. Retrieved from the Internet <https://arxiv.org/pdf/2211.01324.pdf%3C/p%3E>., Mar. 14, 2023, 24 Pages.

Bessmeltsev, Mikhail , et al., “Vectorization of Line Drawings via PolyVector Fields”, Cornell University arXiv, arXiv.org [retrieved Aug. 9, 2023]. Retrieved from the Internet <https://arxiv.org/pdf/1801.01922.pdf>., Sep. 5, 2018, 12 pages.

Blattmann, Andreas , et al., “Align your Latents: High-Resolution Video Synthesis with Latent Diffusion Models”, Cornell University arXiv, arXiv.org [retrieved Aug. 9, 2023]. Retrieved from the Internet <https://arxiv.org/pdf/2304.08818.pdf>., Apr. 18, 2023, 44 Pages.

Campbell, Neill D. F., et al., “Learning a manifold of fonts”, ACM Transactions on Graphics, vol. 33, No. 4, Article No. 91 [retrieved Aug. 9, 2023]. Retrieved from the Internet <https://citeseerx.ist.psu.edu/document?repid=rep1&type=pdf&doi=f86730a690806b2c3684ba7e751fabdbd8d6e3d8>., Jul. 27, 2014, 11 Pages.

Carlier, Alexandre , et al., “DeepSVG: A Hierarchical Generative Network for Vector Graphics Animation”, arXiv Preprint, arXiv.org [retrieved Aug. 9, 2023]. Retrieved from the Internet <https://arxiv.org/pdf/2007.11301.pdf>., Oct. 22, 2020, 19 pages.

Cha, Junbum , et al., “Few-shot compositional font generation with dual memory”, Cornell University arXiv, arXiv.org [retrieved Aug. 9, 2023]. Retrieved from the Internet <https://arxiv.org/pdf/2005.10510.pdf>., Jul. 16, 2020, 25 Pages.

Chen, Ting , et al., “Analog Bits: Generating Discrete Data using Diffusion Models with Self-Conditioning”, Cornell University arXiv, arXiv.org [retrieved Aug. 9, 2023]. Retrieved from the Internet <https://arxiv.org/pdf/2208.04202.pdf>., Mar. 1, 2023, 23 Pages.

Das, Ayan , et al., “ChiroDiff: Modelling chirographic data with Diffusion Models”, Cornell University arXiv, arXiv.org [retrieved Aug. 9, 2023]. Retrieved from the Internet <https://arxiv.org/pdf/2304.03785.pdf>., Apr. 7, 2023, 12 Pages.

Devlin, Jacob , et al., “Bert: Pretraining of deep bidirectional transformers for language understanding”, Cornell University arXiv, arXiv.org [retrieved Aug. 9, 2023]. Retrieved from the Internet <https://arxiv.org/pdf/1810.04805.pdf&usg=ALkJrhhzxICL6yTht2BRmH9atgvKFxHsxQ>., May 24, 2019, 16 Pages.

Dhariwal, Prafulla , et al., “Diffusion Models Beat GANs on Image Synthesis”, Cornell University arXiv, arXiv.org [retrieved Aug. 9, 2023]. Retrieved from the Internet <https://arxiv.org/pdf/2105.05233.pdf>., Jun. 1, 2021, 44 Pages.

Gao, Yue , et al., “Artistic Glyph Image Synthesis via One-Stage Few-Shot Learning”, arXiv Preprint, arXiv.org [retrieved Aug. 9, 2023]. Retrieved from the Internet <https://arxiv.org/pdf/1910.04987.pdf>., May 19, 2020, 12 pages.

Gao, Yiming , et al., “GAN-Based Unpaired Chinese Character Image Translation via Skeleton Transformation and Stroke Rendering”, Proceedings of the AAAI Conference on Artificial Intelligence, vol. 34, No. 01 [retrieved Aug. 9, 2023]. Retrieved from the Internet, Apr. 3, 2020, 8 Pages.

Ha, David , et al., “A Neural Representation of Sketch Drawings”, arXiv Preprint, arXiv.org [retrieved Aug. 9, 2023]. Retrieved from the Internet <https://arxiv.org/pdf/1704.03477.pdf>., May 19, 2017, 15 pages.

Ho, Jonathan , et al., “Cascaded Diffusion Models for High Fidelity Image Generation”, Cornell University arXiv, arXiv.org [retrieved Aug. 9, 2023]. Retrieved from the Internet <https://arxiv.org/pdf/2106.15282.pdf>., Dec. 17, 2021, 33 Pages.

Ho, Jonathan , “Denoising Diffusion Probabilistic Models”, Cornell University arXiv, arXiv.org [retrieved Aug. 9, 2023]. Retrieved from the Internet <https://arxiv.org/pdf/2006.11239.pdf>., Dec. 16, 2020, 25 Pages.

Ho, Jonathan , et al., “Imagen video: High definition video generation with diffusion models”, Cornell University arXiv, arXiv.org [retrieved Aug. 9, 2023]. Retrieved from the Internet <https://arxiv.org/pdf/2210.02303.pdf>., Oct. 5, 2022, 18 Pages.

Hui, Ka-Hei , et al., “Neural wavelet-domain diffusion for 3d shape generation”, Cornell University arXiv, arXiv.org [retrieved Aug. 9, 2023]. Retrieved from the Internet <https://arxiv.org/pdf/2209.08725.pdf>., Sep. 19, 2022, 9 Pages.

Jiang, Yue , et al., “SCFont: Structure-Guided Chinese Font Generation via Deep Stacked Networks”, Proceedings of the AAAI Conference on Artificial Intelligence, vol. 33 No. 01 [retrieved Aug. 9, 2023]. Retrieved from the Internet <https://ojs.aaai.org/index.php/AAAI/article/view/4294>., Jul. 17, 2019, 8 Pages.

Kingma, Diederik P, et al., “Auto-Encoding Variational Bayes”, Cornell University arXiv, arXiv.org [retrieved Aug. 9, 2023]. Retrieved from the Internet <https://arxiv.org/pdf/1312.6114.pdf>., May 1, 2014, 14 Pages.

Kong, Yuxin , et al., “Look Closer to Supervise Better: One-Shot Font Generation via Component-Based Discriminator”, Cornell University arXiv, arXiv.org [retrieved Aug. 9, 2023]. Retrieved from the Internet <https://arxiv.org/pdf/2205.00146.pdf>., May 8, 2022, 16 Pages.

Lee, Juho , et al., “Set Transformer: A Framework for Attention-based Permutation-Invariant Neural Networks”, Cornell University arXiv, arXiv.org [retrieved Aug. 9, 2023]. Retrieved from the Internet <https://arxiv.org/pdf/1810.00825.pdf>., May 26, 2019, 17 Pages.

Lian, Zhouhui , et al., “EasyFont: A Style Learning-Based System to Easily Build Your Large-Scale Handwriting Fonts”, ACM Transactions on Graphics, vol. 38, No. 1 [retrieved Aug. 9, 2023]. Retrieved from the Internet <https://openreview.net/pdf?id=07TwwrH5iB>., Dec. 14, 2018, 18 Pages.

Lin, Chen-Hsuan , et al., “Magic3D: High-Resolution Text-to-3D Content Creation”, Cornell University arXiv, arXiv.org [retrieved Aug. 9, 2023]. Retrieved from the Internet <https://arxiv.org/pdf/2211.10440.pdf>., Mar. 25, 2023, 18 Pages.

Lopes, Raphael Gontijo, et al., “A Learned Representation for Scalable Vector Graphics”, 2019 IEEE/CVF International Conference on Computer Vision (ICCV), vol. 1 [Aug. 9, 2023]. Retrieved from the Internet <https://openaccess.thecvf.com/content_ICCV_2019/papers/Lopes_A_Learned_Representation_for_Scalable_Vector_Graphics_ICCV_2019_paper.pdf>., Nov. 2019, 10 pages.

Loshchilov, Ilya , et al., “Decoupled Weight Decay Regularization”, Cornell University arXiv, arXiv.org [retrieved Aug. 9, 2023]. Retrieved from the Internet <https://arxiv.org/pdf/1711.05101.pdf>., Jan. 4, 2019, 19 Pages.

Nichol, Alex , et al., “Improved Denoising Diffusion Probabilistic Models”, Cornell University arXiv, arXiv.org [retrieved Aug. 9, 2023]. Retrieved from the Internet <https://arxiv.org/pdf/2102.09672.pdf>., Feb. 18, 2021, 17 Pages.

Park, Song , et al., “Multiple heads are better than one: Few-shot font generation with multiple localized experts”, Cornell University arXiv, arXiv.org [retrieved Aug. 9, 2023]. Retrieved from the Internet <https://arxiv.org/pdf/2104.00887.pdf>., Apr. 2, 2021, 14 Pages.

Reddy, Pradyumna , et al., “Im2Vec: Synthesizing Vector Graphics without Vector Supervision”, Cornell University arXiv, arXiv.org [retrieved Aug. 9, 2023]. Retrieved from the Internet <https://arxiv.org/pdf/2102.02798.pdf>., Apr. 1, 2021, 10 Pages.

Ribeiro, Leo Sampaio Ferraz, et al., “Sketchformer: Transformer-based Representation for Sketched Structure”, arXiv Preprint, Cornell University, arXiv.org [retrieved Aug. 9, 2023]. Retrieved from the Internet <https://arxiv.org/pdf/2002.10381.pdf>., 028/2482020, 9 pages.

Rombach, Robin , et al., “High-Resolution Image Synthesis with Latent Diffusion Models”, Cornell University arXiv, arXiv.org [retrieved Aug. 11, 2023]. Retrieved from the Internet <https://arxiv.org/pdf/2112.10752.pdf>., Apr. 13, 2022, 45 Pages.

Saharia, Chitwan , et al., “Photorealistic Text-to-Image Diffusion Models with Deep Language Understanding”, Cornell University arXiv, arXiv.org [retrieved Aug. 11, 2023]. Retrieved from the Internet <https://arxiv.org/pdf/2205.11487.pdf>., May 23, 2022, 46 Pages.

(56) References Cited

OTHER PUBLICATIONS

Srivatsan, Nikita , "Scalable font reconstruction with dual latent manifolds", Cornell University arXiv, arXiv.org [retrieved Aug. 9, 2023]. Retrieved from the Internet <https://arxiv.org/pdf/2109.06627.pdf>., Sep. 10, 2021, 13 Pages.
Suveeranont, Rapee , et al., "Example-Based Automatic Font Generation", International Symposium on Smart Graphics [retrieved Aug. 9, 2023]. Retrieved from the Internet <http://www-ui.is.s.u-tokyo.ac.jp/~takeo/papers/rapee_smartgraphics2010_font.pdf>., Jun. 24, 2010, 12 Pages.
Tang, Licheng , et al., "Few-Shot Font Generation by Learning Fine-Grained Local Styles", Cornell University arXiv, arXiv.org [retrieved Aug. 9, 2023]. Retrieved from the Internet <https://arxiv.org/pdf/2205.09965.pdf>., Sep. 1, 2022, 19 Pages.
Vaswani, Ashish , et al., "Attention Is All You Need", Cornell University arXiv Preprint, arXiv.org [retrieved Aug. 9, 2023]. Retrieved from the Internet <https://arxiv.org/pdf/1706.03762.pdf>., Dec. 6, 2017, 15 pages.
Wang, Yizhi , et al., "DeepVecFont: Synthesizing High-quality Vector Fonts via Dual-modality Learning", Cornell University arXiv, arXiv.org [retrieved Aug. 9, 2023]. Retrieved from the Internet <https://arxiv.org/pdf/2110.06688.pdf>., Oct. 13, 2021, 15 Pages.
Wang, Yuqing , et al., "DeepVecFont-v2: Exploiting Transformers To Synthesize Vector Fonts With Higher Quality", EEE/CVF Conference on Computer Vision and Pattern Recognition (CVPR) [retrieved Aug. 9, 2023]. Retrieved from the Internet <https://arxiv.org/pdf/2303.14585.pdf>, Mar. 25, 2023, 9 Pages.
Wang, Xintao , et al., "Real-ESRGAN: Training Real-World Blind Super-Resolution with Pure Synthetic Data", Cornell University arXiv, arXiv.org [retrieved Aug. 9, 2023]. Retrieved from the Internet <https://arxiv.org/pdf/2107.10833.pdf>., Aug. 17, 2021, 13 Pages.
Wang, Qiang , et al., "SketchKnitter: Vectorized Sketch Generation with Diffusion Models",[retrieved Aug. 9, 2023]. Retrieved from the Internet <https://openreview.net/pdf?id=4eJ43EN2g6l>., Feb. 1, 2023, 17 Pages.

* cited by examiner

| | path index | | | grid cell X index | | | | grid cell Y index | | | | Δx | Δy |
|---|---|---|---|---|---|---|---|---|---|---|---|---|---|
| CP1 | 0 | 0 | 0 | 1 | 1 | 0 | 0 | 0 | 1 | 0 | 0 | 0.34 | 0.47 |
| CP2 | 0 | 0 | 0 | 0 | 1 | 1 | 0 | 0 | 1 | 0 | 0 | 0.15 | 0.20 |
| ... | ... | | | ... | | | | ... | | | | ... | |
| CP21 | 0 | 0 | 1 | 1 | 0 | 1 | 0 | 1 | 1 | 1 | 0 | 0.03 | 0.50 |
| ... | ... | | | ... | | | | ... | | | | ... | |
| NULL | 1 | 1 | 1 | 0 | 0 | 0 | 0 | 0 | 0 | 0 | 0 | 0.00 | 0.00 |
| NULL | 1 | 1 | 1 | 0 | 0 | 0 | 0 | 0 | 0 | 0 | 0 | 0.00 | 0.00 |

Training Data 702

Clean Raster Glyph 704

Rasterization Module 202

Raster Diffusion Model 204

Image Noise 706

Clean Raster Glyph 704

Backpropagation Operation 712

Loss Function 710

Noisy Raster Glyph 708

Stopping Criterion 714

Rasterized Glyph 206

Training Data 802

Clean Vector Glyph 804

Vectorization Module 208

Vector Diffusion Model 210

Image Noise 706

Clean Vector Glyph 804

Loss Function 710

Backpropagation Operation 712

Noisy Vector Glyph 806

Stopping Criterion 714

Vector Glyph 126

VECTOR FONT GENERATION BASED ON CASCADED DIFFUSION

RELATED APPLICATION

This application claims priority under 35 USC 119 or 365 to Greek Application No. 20230100834, filed Oct. 11, 2023, the disclosure of which is incorporated in its entirety.

BACKGROUND

In computer graphics, vector fonts are a type of computer font that uses mathematical equations to describe shapes of characters, rather than storing the characters as individual pixel-based images. This approach allows vector fonts to be scaled to different sizes without loss of quality. Vector fonts are commonly used in graphics design, desktop publishing, and digital typography. However, existing techniques for generating vector fonts cause errors and result in visual inaccuracies, computational inefficiencies, and increased power consumption in real world scenarios.

SUMMARY

Techniques and systems for vector font generation based on cascaded diffusion are described. In an example, a glyph generation system receives a sample glyph in a target font and a target glyph identifier. The glyph generation system then generates, using a raster diffusion model, a rasterized glyph in the target font based on the target glyph identifier and the sample glyph, the rasterized glyph having a first level of resolution. For example, the rasterized glyph captures a shape and a style of the sample glyph in the target font. In some examples, the raster diffusion model includes extracting embeddings from the sample glyph in the target font and the target glyph identifier.

The glyph generation system also generates a vector glyph using a vector diffusion model by vectorizing the rasterized glyph, the vector glyph having a second level of resolution different than the first level of resolution. For example, the vector glyph includes an ordered sequence of control points using one or more cubic Bezier curve paths based on one or more locations of control points of the rasterized glyph. In some examples, the vector diffusion model upsamples the rasterized glyph and predicts locations for one or more control points that form a curve of the vector glyph. The glyph generation system then displays the vector glyph in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
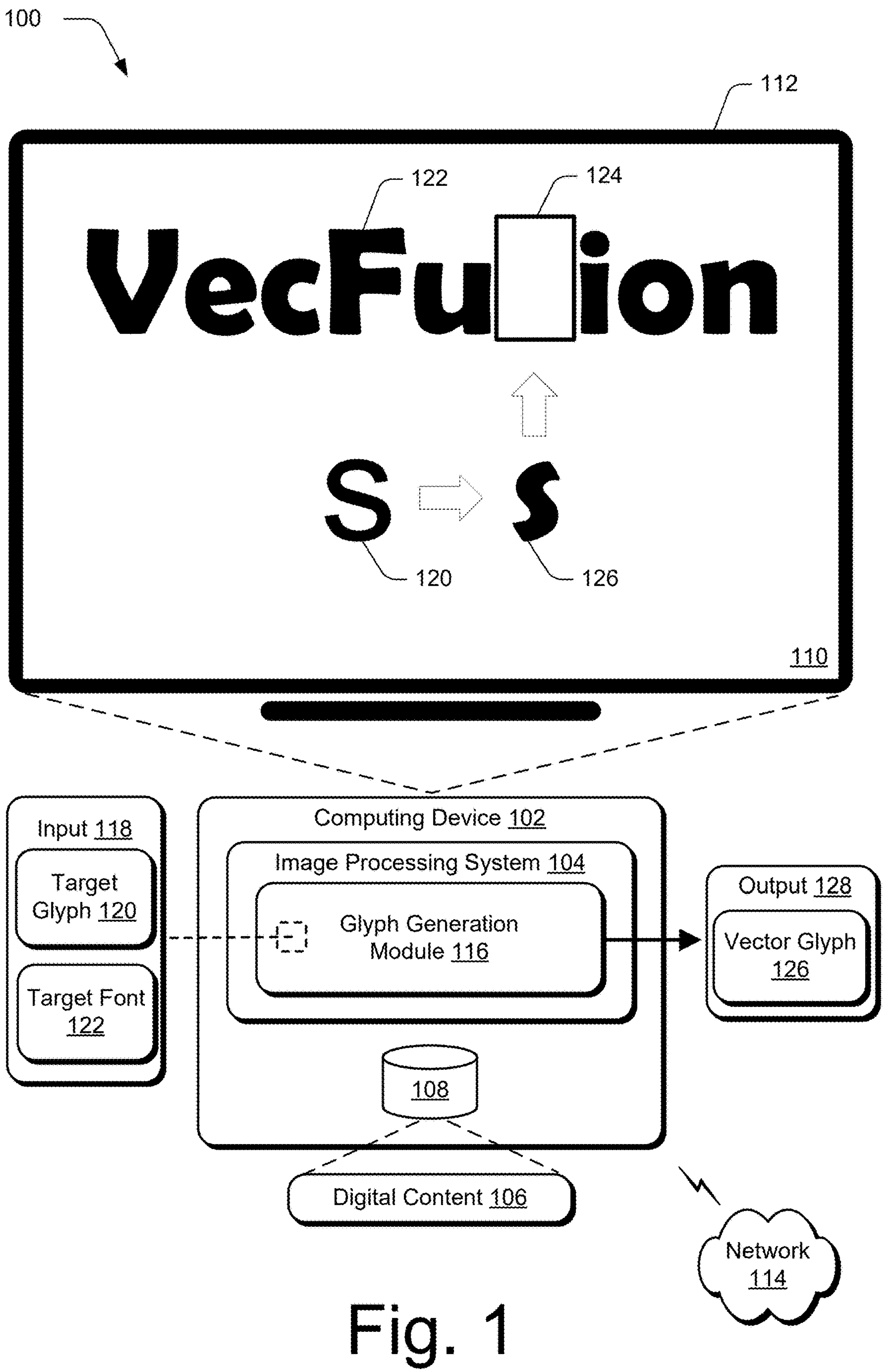
FIG. 1 is an illustration of a digital medium environment in an example implementation that is operable to employ techniques and systems for vector font generation based on cascaded diffusion as described herein.

Vector fonts are collections of glyphs that define an appearance or form of a character, e.g., a letter, a number, or a symbol, and are used in graphic design, arts, publishing, and motion graphics. Unlike raster fonts, which store glyphs as individual pixel-based images, vector fonts use mathematical equations to describe shapes of glyphs. Because of this, vector fonts are "scalable" and rendered at multiple resolutions without quality degradation. Vector fonts also include control points that define curves of glyphs. Individual glyphs of a particular vector font are manually designed and created by a user that specifies location for the control points. However, manually creating glyphs is time-consuming and involves a high level of expertise in font design. For this reason, available glyphs in vector fonts are limited, presenting challenges to font users when a particular glyph is missing from a vector font.

Conventional applications use autoregressive models to automatically synthesize vector fonts to generate additional glyphs. However, these conventional applications struggle to effectively model a diverse range of topology structures and glyph variations of a font. Vector curves in fonts are ambiguous, which poses challenges to autoregressive models during modeling, resulting in unwanted artifacts in generated glyphs. The conventional applications also result in imprecise control point positions, compromising the editability of the generated glyphs.

Techniques and systems are described for vector font generation based on cascaded diffusion that overcome these limitations. For example, a glyph generation system uses a cascaded diffusion model including both a raster diffusion model and a vector diffusion model. The glyph generation system begins in this example by receiving a target glyph and a target font. For example, the target glyph is identified by a Unicode identifier corresponding to a particular glyph that a user desires to generate. The target font is identified by a font name or by multiple sample glyphs of the target font.

For example, the user wishes to generate a dollar sign "$" in a font called "Elephant" because the dollar sign is missing from that font. The user inputs a Unicode identifier corresponding to the dollar sign as well as sample raster format glyphs "A," "B," "C," "d," "e", and "f" in the font "Elephant" into an application employing vector font generation based on cascaded diffusion. Accordingly, the glyph generation system receives the target glyph identifying the dollar sign and the target font "Elephant" to generate the intended glyph.

The glyph generation system uses the raster diffusion model to generate a rasterized glyph based on the target glyph and the target font. To do this, the raster diffusion model extracts embeddings from the target glyph and the target font that specify ordered sequences of control points for curves of the target glyph and the target font. The raster diffusion model then initiates a reverse diffusion process to generate the rasterized glyph conditioned on the embeddings. This generates an auxiliary set of control point fields encoding information for control points that define curves of the rasterized glyph. For example, the rasterized glyph captures a shape of the target glyph in the style of the target font. However, the rasterized glyph has a lower level of resolution than desired. For this reason, the glyph generation system employs the vector diffusion model to synthesize a vector glyph based on the rasterized glyph.

To synthesize the vector glyph, the glyph generation system first inputs the rasterized glyph into the vector diffusion model. The vector diffusion model synthesizes a vector format of the rasterized glyph that captures fine-grained placements for the control points from the rasterized glyph. To do this, the vector diffusion model learns structured ordering of control points from curves of glyphs in the target font. Based on the fine-grained placements for the control points, the vector diffusion model generates an output including the vector glyph. For example, the vector glyph is a vectorized format version of the rasterized glyph and has a higher level of resolution than the rasterized glyph. The vector glyph is then displayed in a user interface for application to typographical media.

Vector font generation based on cascaded diffusion in this manner overcomes the disadvantages of conventional techniques that are limited to using autoregressive models to generate glyphs. Unlike conventional applications, vector font generation based on cascaded diffusion employs a raster diffusion model that generates a rasterized glyph that capture a shape of the target glyph and a style of the target font before the rasterized glyph is input into a vector diffusion model. This reduces ambiguity of vector curves for the input to the vector diffusion model and reduces unwanted artifacts in the vector glyph. Vector font generation based on cascaded diffusion also increases precision of control point placement in the vector glyph, increasing ease of editability of the vector glyph.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for vector font generation based on cascaded diffusion described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 9.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a glyph generation module 116 which is illustrated as incorporated by the image processing system 104 to process the digital content 106. In some examples, the glyph generation module 116 is separate from the image processing system 104 such as in an example in which the glyph generation module 116 is available via the network 114.

The glyph generation module 116 first receives an input 118 including a target glyph 120 and a target font 122. For example, the target glyph 120 is a missing glyph 124 in the target font 122. In some examples, the glyph generation module 116 receives a Unicode identifier that identifies the target glyph 120 and multiple glyphs of the target font 122. For example, the glyph generation module 116 receives a file containing the multiple glyphs of the target font 122 or individual images of glyphs of the target font 122. Based on the input 118, the glyph generation module 116 generates a vector glyph 126 that is a version of the target glyph 120 that matches a style of the target font 122.

To generate the vector glyph 126, the glyph generation module 116 first uses a raster diffusion model to generate a rasterized glyph based on the target glyph 120 and the target font 122. For example, the raster diffusion model extracts embeddings from the target glyph 120 and the target font 122 and initiates a reverse diffusion process to generate the rasterized glyph conditioned on the embeddings. The raster diffusion model also generates an auxiliary set of control point fields encoding information for control points that define curves of glyphs, as discussed in further detail below.

The glyph generation module 116 then uses a vector diffusion model to generate the vector glyph 126 based on the rasterized glyph. For example, the vector diffusion model synthesizes a vector format of the rasterized glyph that captures fine-grained placements for the control points. Based on the fine-grained placements for the control points, the glyph generation module 116 generates an output 128 including the vector glyph 126 that has a higher level of resolution than the rasterized glyph, for display in the user interface 110.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Vector Font Generation Based on Cascaded Diffusion

Figure 2:
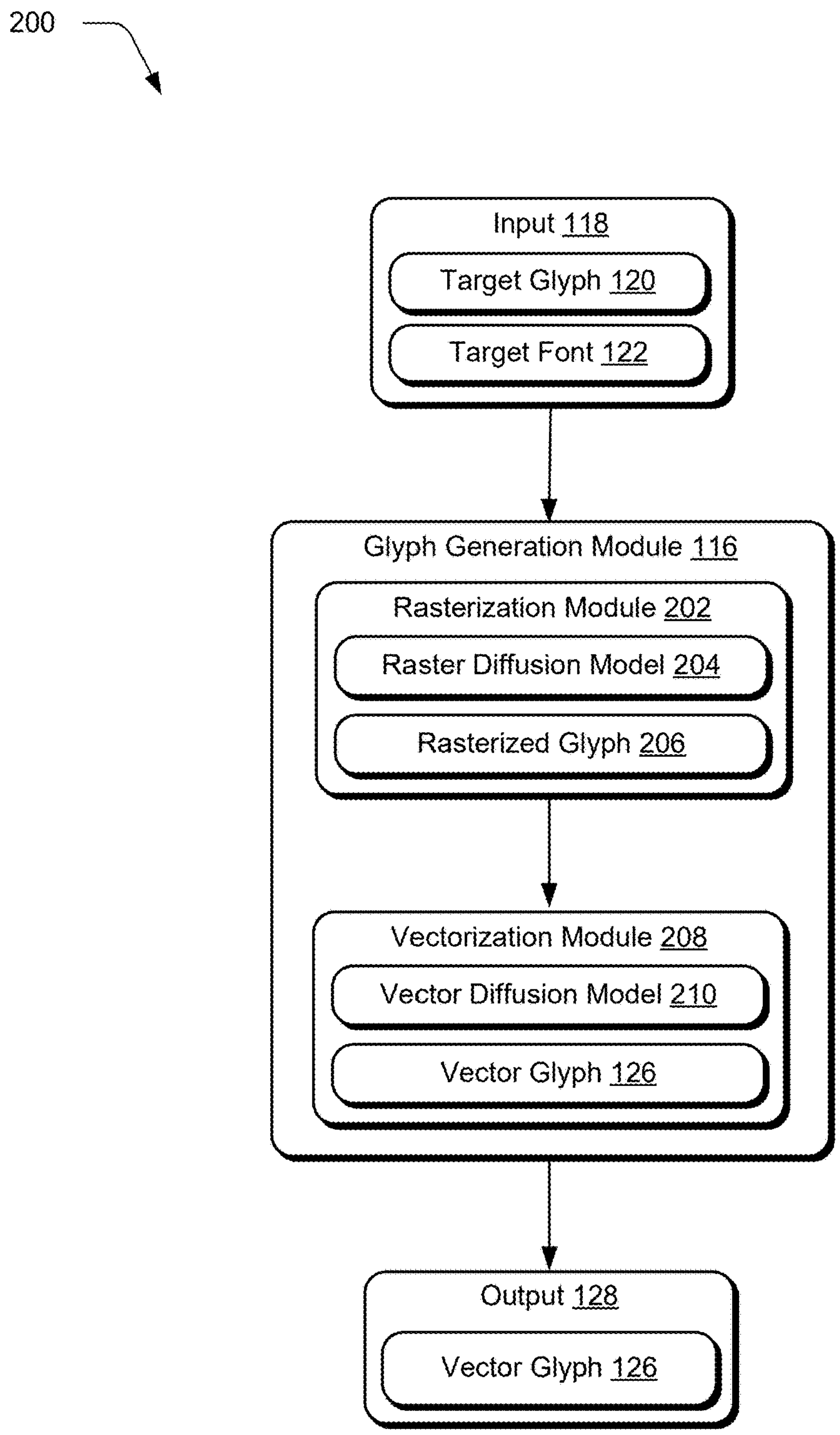
FIG. 2 depicts a system in an example implementation showing operation of a glyph generation module for vector font generation based on cascaded diffusion.

FIG. 2 depicts a system 200 in an example implementation showing operation of the glyph generation module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-9.

To begin in this example, a glyph generation module 116 receives an input 118 including a target glyph 120 and a target font 122. In some examples, the target glyph 120 is an identifier of a specific glyph for generation, including a Unicode identifier. The target font 122 is identified by multiple glyphs of the target font 122 or by a name of the target font 122 in some examples.

The glyph generation module 116 also includes a rasterization module 202. The rasterization module 202 employs a raster diffusion model 204 to generate a rasterized glyph 206. The rasterized glyph 206 captures a style of the target font 122 in a shape of the target glyph 120, but at a lower level of resolution than example glyphs of the target font 122. To do this, the raster diffusion model 204 extracts embeddings for control points that define curves from the target glyph 120 and the target font 122. The raster diffusion model 204 then predicts locations for control points based on the embeddings, forming the rasterized glyph 206.

The glyph generation module 116 also includes a vectorization module 208. The vectorization module 208 employs a vector diffusion model 210 to generate a vector glyph 126 based on the rasterized glyph 206. For example, the vectorization module 208 takes as input the rasterized glyph 206 and generates the vector glyph 126 by vectorizing the rasterized glyph 206. The vector glyph 126 includes an ordered sequence of control points in cubic Bezier curve paths based on locations of control points of the rasterized glyph 206. The vector glyph 126 has a higher level of resolution than the rasterized glyph 206.

The glyph generation module 116 then generates an output 128 including the vector glyph 126 for display in the user interface 110. For example, the vector glyph 126 is added to an existing collection of glyphs corresponding to the target font 122 for application to digital content.

Figure 3:
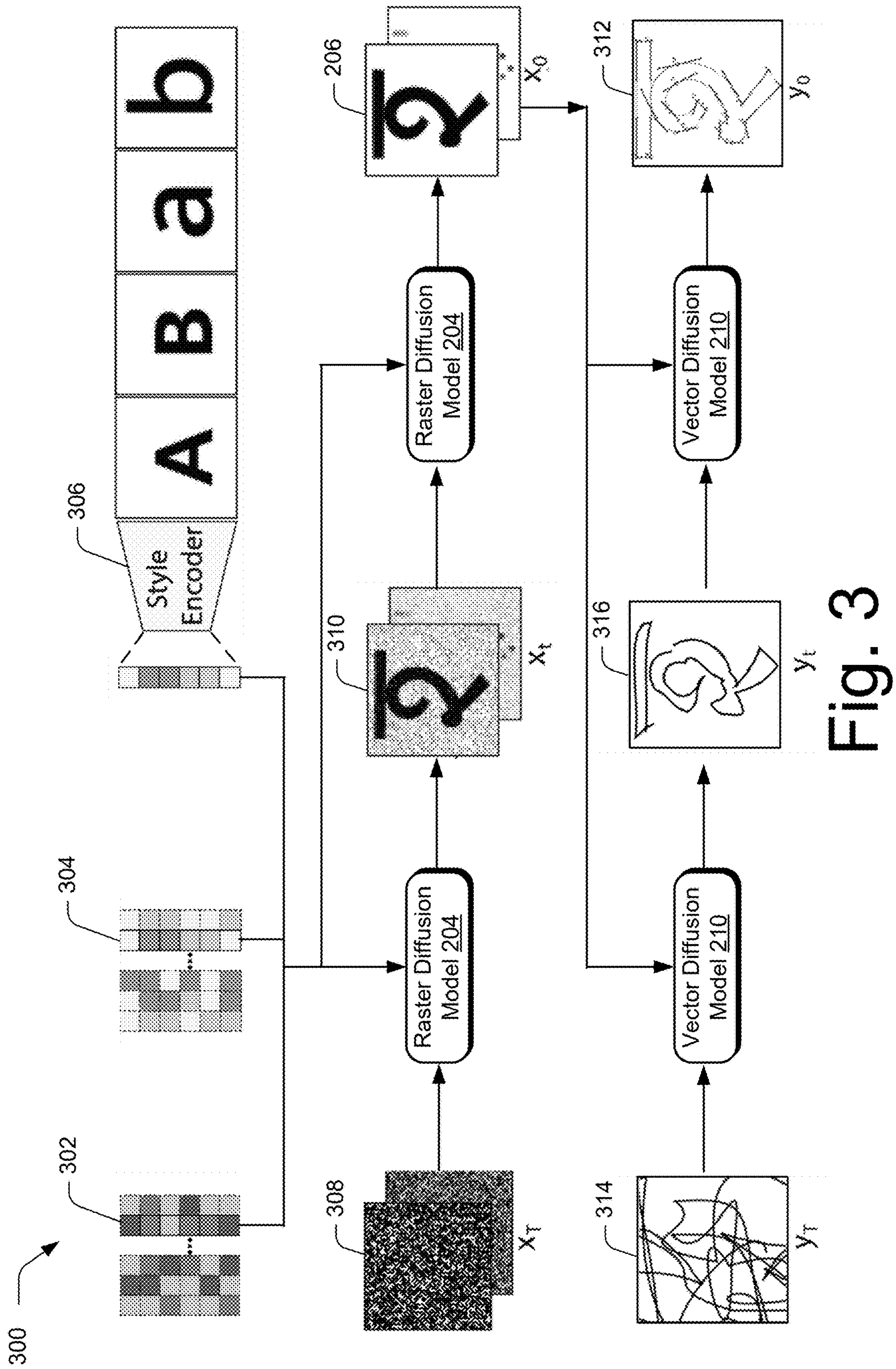
FIG. 3 depicts an example of an architecture of the glyph generation module.

FIG. 3 depicts an example 300 of an architecture of the glyph generation module 116. As illustrated, the glyph generation module 116 first receives a target glyph 120 and a target font 122. In this example, the target glyph 120 is a Unicode identifier, or code point, that identifies the target glyph 120 on a glyph table 302. The target font 122 is specified in the form of multiple representative raster images of other glyphs in a style by a font style name that identifies the target font 122 on a font table 304. In this example, the target glyph 120 is the target letter "sha" of the Devanagari alphabet, identified on the glyph table 302, and the target font 122 is the target font style called "Mukta," identified on the font table 304 as a font style encoding 306, which is a mapping that assigns glyphs to unique values. In this example, the glyph generation module 116 generates a vector glyph 126 that is the target glyph 120 "sha" in a style of the target font 122 "Mukta." In other examples, the glyph generation module 116 synthesizes novel fonts by transferring a style of exemplar images of glyphs or interpolates font styles.

A vector representation for a glyph includes ordered sequences of control points in cubic Bézier curve paths. Control points are repeated in some examples in the generated sequences to manipulate continuity of a vector path. In this example, the glyph generation module 116 generates an appropriate number of vector paths, control points, and point repetitions tailored to each glyph and font style. As part of this, the glyph generation module 116 learns the ordering of control points for each path, including where first and last control points are placed, as placement patterns reflect preferences of the font's creator.

To generate the vector glyph 126, the glyph generation module 116 uses a two-stage cascade including a rasterization module 202 and a vectorization module 208. In the first stage, the rasterization module 202 uses a raster diffusion model 204 to extract embeddings for the target glyph 120 and the target font 122 before initiating a reverse diffusion process to generate a rasterized glyph 206 conditioned on the embeddings. The rasterized glyph 206 captures a shape of the target glyph 120 and a style of the target font 122 at a low resolution. Additionally, the rasterization module 202 generates an auxiliary set of control point fields encoding information for control point location, multiplicity, and ordering. In the second stage, the vectorization module 208 uses a vector diffusion model 210 to synthesize a vector format by capturing fine-grained placement of control points guided by the control point fields generated in the first stage, generating the vector glyph 126. The rasterization module 202 and the vectorization module 208 are discussed in further detail below.

The raster diffusion model 204 creates a rasterized glyph 206, $x_0$ in FIG. 3, that encodes information about the target glyph 120 in pixel space. To do this, the raster diffusion model 204 gradually transforms a sampled image $x_T$ 308 sampled from a unit Gaussian noise distribution toward rasterized glyph 206 in a series of T denoising steps of a denoiser network. At each step t=1 . . . T, a trained neural network executes the transition $x_t \rightarrow x_{t-1}$ by predicting noise content to subtract from image $x_t$ 310. The denoiser network is conditioned on learned embeddings of the target font 122 and the target font 122.

To generate the glyph identifier embeddings that encode the input glyph codepoint for the target glyph 120, a one-hot vector representation is generated for unique glyph codepoints available in the dataset. Given a codepoint of the target glyph 120, the one-hot vector representation is mapped to a continuous embedding g through the glyph table 302. The glyph table 302 stores embeddings for codepoints available in the dataset and retrieves them using the one-hot vector as indices.

To generate the font style embedding that encodes the font style of the target font 122, a one-hot vector representation is generated for font styles available in the dataset. Given the target font 122, the one-hot vector is mapped to a continuous embedding f through the font table 304. In other examples, the font embedding is extracted from input images provided as examples for the target font 122. The rasterization module 202 uses an image encoder proposed in DeepVecFont [Wang and Lian, 2021] given a set of reference images of glyphs for the target font 122 to concatenate and pass through a convolutional neural network.

Figure 4:
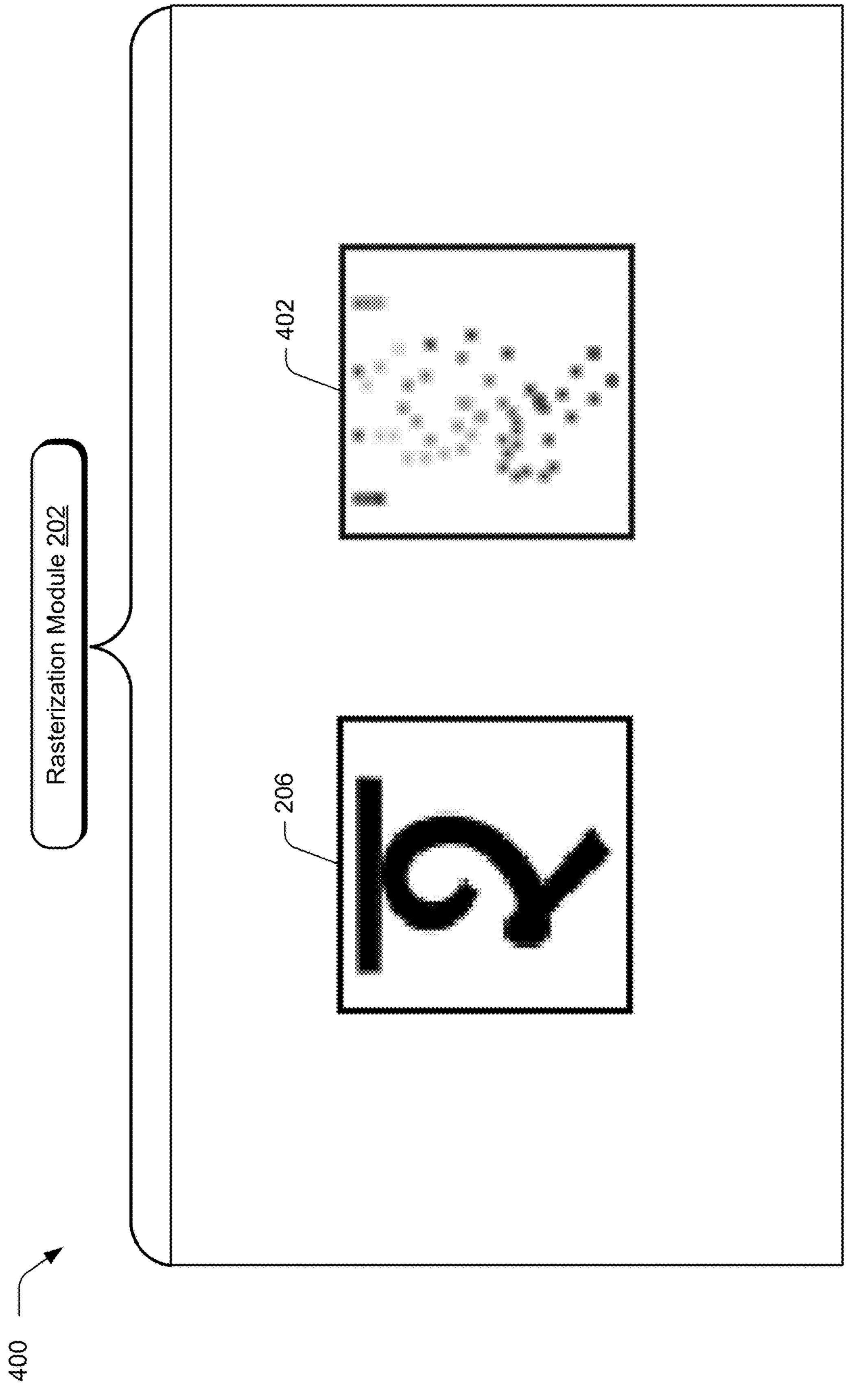
FIG. 4 depicts an example of a rasterized glyph of the rasterization module.

FIG. 4 depicts an example 400 of the rasterized glyph 206 of the rasterization module 202. The rasterized glyph 206 is a N×N image that includes a first channel includes an image representing a grayscale rasterized image of the target glyph 120. The rasterized glyph 206 also includes additional channels that store control point fields, which encode information about the control point location, multiplicity, and ordering. During training, the raster diffusion model 204 generates the control point field by rendering each control point as a Gaussian "blob" centered at the 2D coordinates (x,y) of the control point. The coordinates are normalized in $[0,1]^2$. Colors of the blob are modulated based on (a) the index of the control point in the sequence of control points of its vector path (e.g., first, second, third, etc. control point), and (b) its multiplicity. Some examples include a look-up function to translate the ordering indices and multiplicities of control points to color intensities. In this example, the raster diffusion model 204 uses three channels for the control point field, which is visualized as an RGB image 402. The channels are concatenated with the raster image of the glyph, forming a 4-channel image.

Returning to FIG. 3, a denoiser for the raster diffusion model 204 is formulated as a UNet architecture [Dhariwal and Nichol, 2021], which is a convolutional neural network used for image segmentation tasks. The raster diffusion model 204 takes the 4-channel image $x_t$ as input and is conditioned on the embedding of time step t, the glyph's codepoint embedding g, and the font style embedding f. Following [Rombach et al., 2022], three embeddings from the input are added and input to each residual block in the UNet. The denoiser network predicts the per-channel noise component of the input image, which is also a 4-channel image.

The raster diffusion model 204 is trained to approximate an optimal denoiser under the condition that the images $x_1$, $x_2$, . . . $x_T$ are created by progressively adding Gaussian noise to the image of the previous step, following [Ho et al., 2020] using the following equation:

$$q(x_t \mid x_{t-1}) = N\left(x_t; \sqrt{1-\beta_t}\, x_{t-1}, \beta_t I\right)$$

where $\beta_t$ represents the variance of the Gaussian noise added at each step. The image $x_T$ converges to a unit Gaussian distribution as T→∞. Following [Ho et al., 2020], the denoiser network is trained with the training objective $\|\epsilon(x_t, t, f, g)-\epsilon\|^2$ so that the mean-squared error loss between the added training noise $\epsilon$ at each step and the predicted noise $\epsilon$(xt, t, f, g) from the network. In some examples, the loss is used to train the denoiser, the glyph table 302, and the font table 304. Given sampled unit Gaussian noise from $x_T$, the glyph's codepoint embedding g and the font style embedding f, the raster diffusion model 204 is applied in T steps to generate the rasterized glyph 206.

In some examples, the following hyperparameters are applied to the rasterization module 202. For example, the number of diffusion steps T is set to 1,000 and a cosine noise schedule is used in the forward diffusion process, following [Nichol and Dhariwal, 2021]. An AdamW optimizer following [Loshchilov and Hutter, 2017] with learning rate $3.24 \cdot 10^{-5}$ is also applied in some examples. The feature embeddings for glyph identifiers and font styles are set to be 896-dimensional in some examples. The control points are rendered as Gaussian blobs with radius of 2 pixels. The raster image resolution is set to 64×64 in some examples. Additionally, in some examples, three channels are used to encode control point ordering and multiplicity as colors.

Given the rasterized glyph 206, the vector diffusion model 210 of the vectorization module 208 generates a target tensor $y_0$ 312 representing the target glyph 120 in vector graphics format. The vector diffusion model 210 uses a reverse diffusion process that gradually transforms a noise tensor $y_T$ 314 including random vectors sampled from a unit Gaussian noise distribution toward the target tensor $y_0$ 312 in a series of denoising steps. In this domain, the noise represents noise on the spatial position and path membership of the control points.

Figure 5:
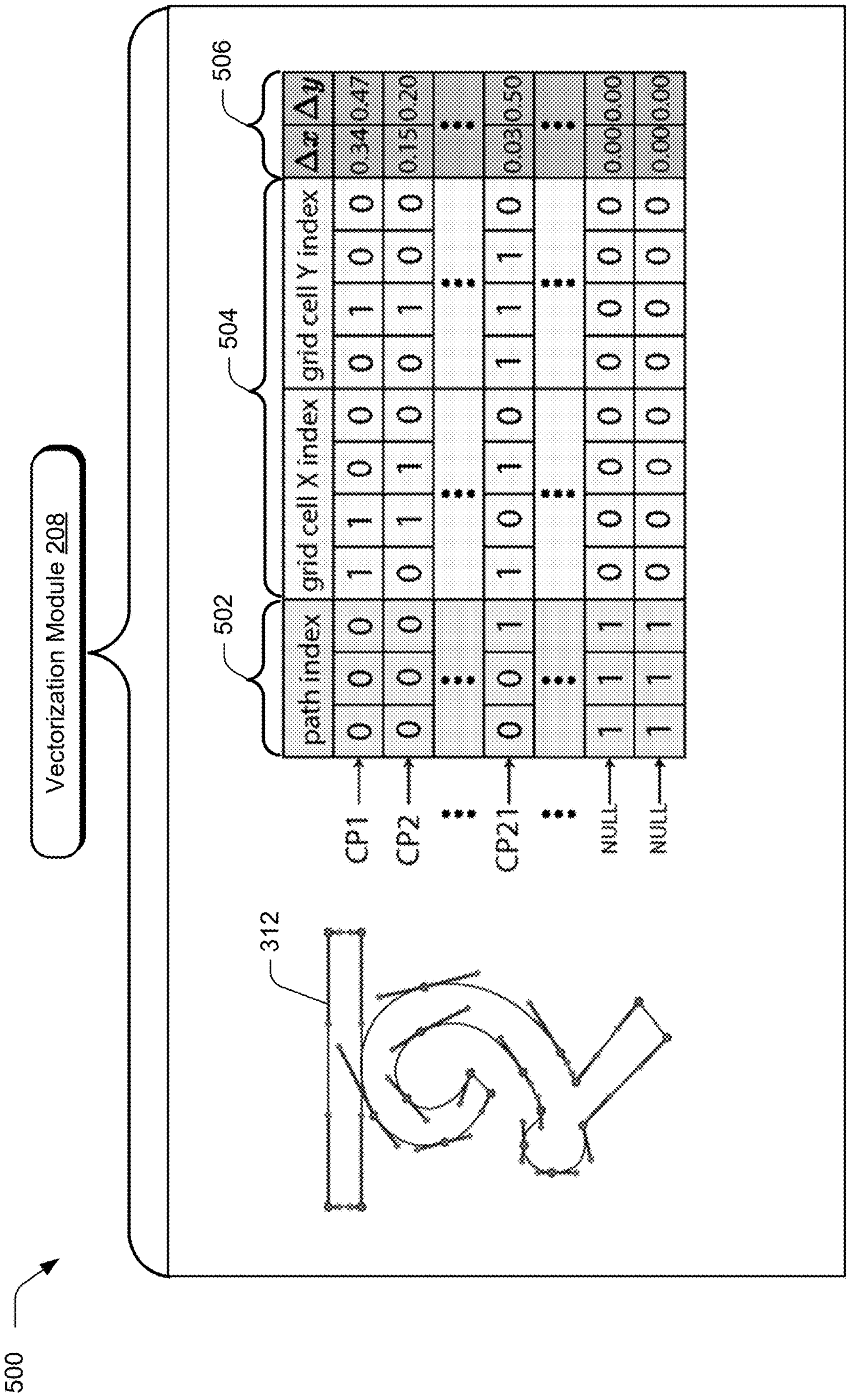
FIG. 5 depicts an example of a target tensor of the vectorization module.

FIG. 5 depicts an example 500 of the target tensor $y_0$ 312 of the vectorization module. The target tensor $y_0$ 312 is a M D tensor, where M represents an upper bound to the total number of control points of a glyph. Each entry in the tensor contains a D-dimensional representation of a control point. Specifically, each entry stores an index of the vector path 502 the control point belongs to, an index of the grid cell 504 containing the control point, and continuous coordinates of the control point 506 expressed relative to the center of the grid cell it belongs to, which are explained in detail below.

Regarding the index of the vector path 502 the control point belongs, during training, each vector path is assigned a unique index. Because the vector paths are re-ordered arbitrarily in some examples without changing the resulting glyph, to reduce unnecessary variability during learning, the vector paths are lexigraphically sorted using the coordinates of a control point closest to the top-left corner of the glyph raster image as sorting keys. Following [Chen et al., 2023], the resulting sorted path index is converted to binary bits. For each control point entry, the binary bits of its vector path are stored. A null entry (i.e., all-one bits) is reserved for entries that do not yield control points.

Regarding the index of the grid cell 504 containing the control point, a coarse P×P grid is defined over the image, with $P_2$ corresponding grid cell centroids. Each control point is assigned to the grid cell that has the closest centroid. The grid cell index is converted to binary bits. For each control point entry, the binary bits of its assigned grid cell are stored.

Regarding the continuous coordinates of the control point 506 expressed relative to the center of the grid cell it belongs to, two continuous values capture the location of each control point. Because the generated control point field approximately highlights regions storing control points, mapping the control point field to discrete cell indices and small continuous residuals, or displacements, reduces continuous coordinate variability.

Returning to FIG. 3, the vector diffusion model 210 formulates a denoiser for the vectorization module 208 as an encoder-only transformer, following [Devlin et al., 2018], which takes a tensor $y_t$ 316 as input and is conditioned on the embedding of time step t and the rasterized glyph 206 from the raster diffusion model 204. The vector diffusion model 210 uses a convolutional neural network to encode the rasterized glyph 206 into high-dimensional features, which are input to the transformer via cross-attention, following [Rombach et al., 2022]. The transformer predicts the noise content as a M×D tensor at each step. The denoiser network is trained according to a mean-squared error loss between training noise and predicted at sampled time steps: $\|\epsilon(y_t, x_0, t)-\epsilon\|^2$.

Using the sampled tensor $y_T$ 314 from the Gaussian noise and rasterized glyph 206 of the rasterization module 202, the denoiser network is applied in a series of T steps to generate the target tensor $y_0$ 312. Following the Analog Bits approach from [Chen et al., 2023], the discrete binary bits in the target tensor $y_0$ 312 representation are modeled as real numbers and are thresholded to obtain the final binary bits. Given the predicted path membership, a set of vector paths are generated according to the largest generated control path index number. Each non-null entry in the generated tensor yields a control point. The control points are ordered based on their entry index. The location of the control point is defined as the coordinate center of the assigned cell in the generated tensor plus the predicted relative displacement. Given this generated information, the vectorization module 208 directly reconstructs the vector paths without further refinement or post-processing.

In this example, the upper bound for the number of control points is M=256. Three bits are used to represent the path membership, which supports up to seven distinct vector paths. P is set to 16, resulting in 256 grid cells represented by eight binary bits. Together with the two-dimensional relative displacement, the final dimension of our target tensor D is 13 in our experiments. The number of diffusion steps T is set to 1,000, using a cosine noise schedule, and the AdamW optimizer [Loshchilov and Hutter, 2017] is applied with learning rate $3.24 \cdot 10^{-5}$ in this example. Additionally, in this example the DDPM sampler following [Ho et al., 2020] is applied using 1,000 steps.

In some examples, vector font generation based on cascaded diffusion is applied to propagate effects to glyphs of a font. For example, given a base font and target examples of italicized or bolded glyphs of the base font, vector font generation based on cascaded diffusion is applied to generate an italic or bold version of the base font.

In other examples, vector font generation based on cascaded diffusion is applied to generate vector icons. Vector icons are graphic symbols or images that are created using vector graphics. For example, the glyph generation module 116 receives an input including a target icon and a target set of icons and generates an icon that has a shape of the target icon in a style of the target set of icons, following the vector font generation based on cascaded diffusion steps outlined above.

Figure 6:
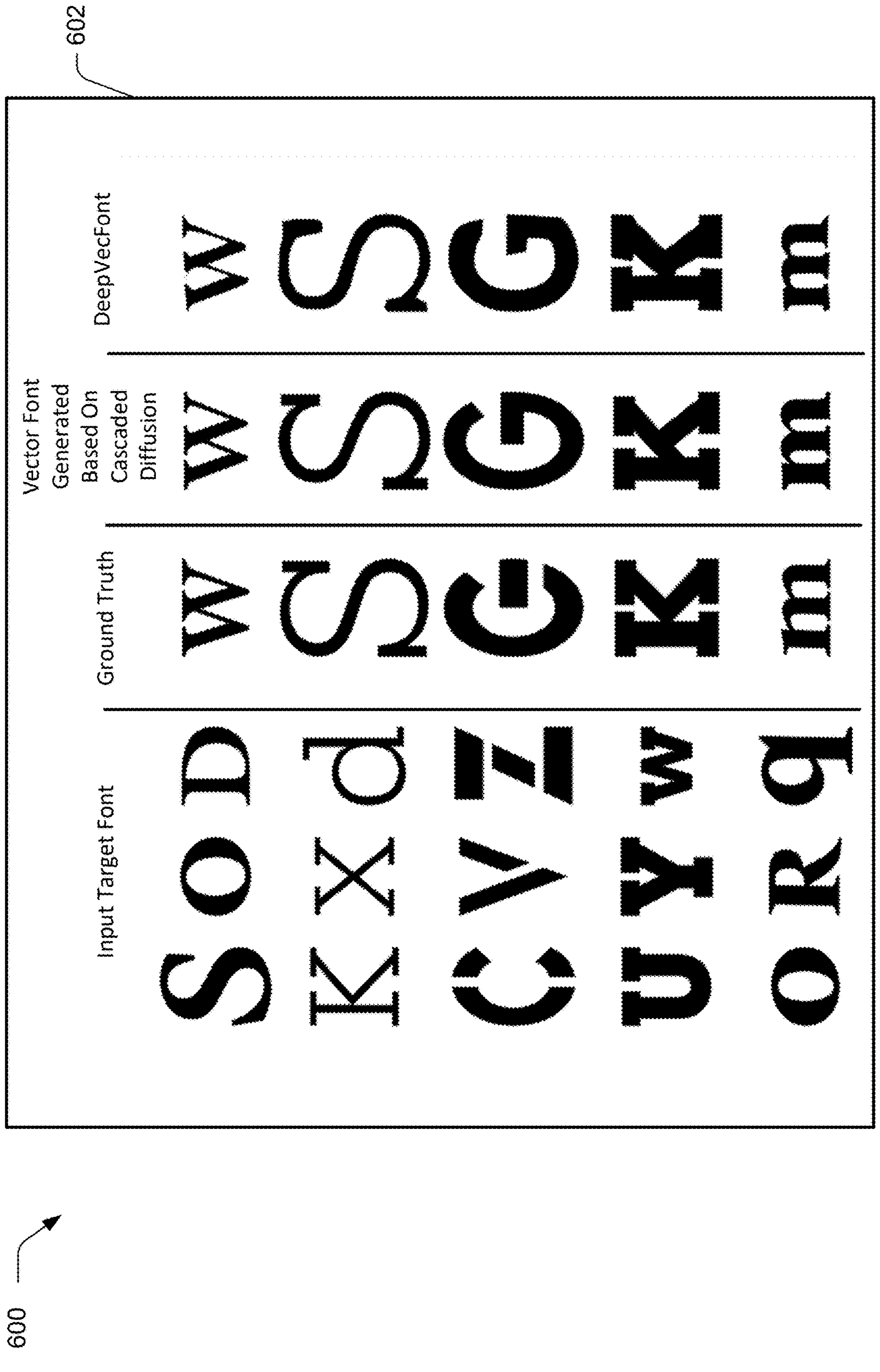
FIG. 6 depicts an example including a table of outputs of vector font generation based on cascaded diffusion.

FIG. 6 depicts an example 600 including a table 602 of outputs of vector font generation based on cascaded diffusion. For example, the table displays an input target font and a corresponding vector font generated based on cascaded diffusion. The vector font generated based on cascaded diffusion shares similarities to the ground truth, which is an example of the target glyph 120 in the target font 122 developed by a user. Additionally, conventional techniques, including DeepVecFont, for generation of vector fonts include additional unwanted artifacts and inaccurate curves that the vector font generated based on cascaded diffusion, when compared to the ground truth, as shown in FIG. 6.

Figure 7:
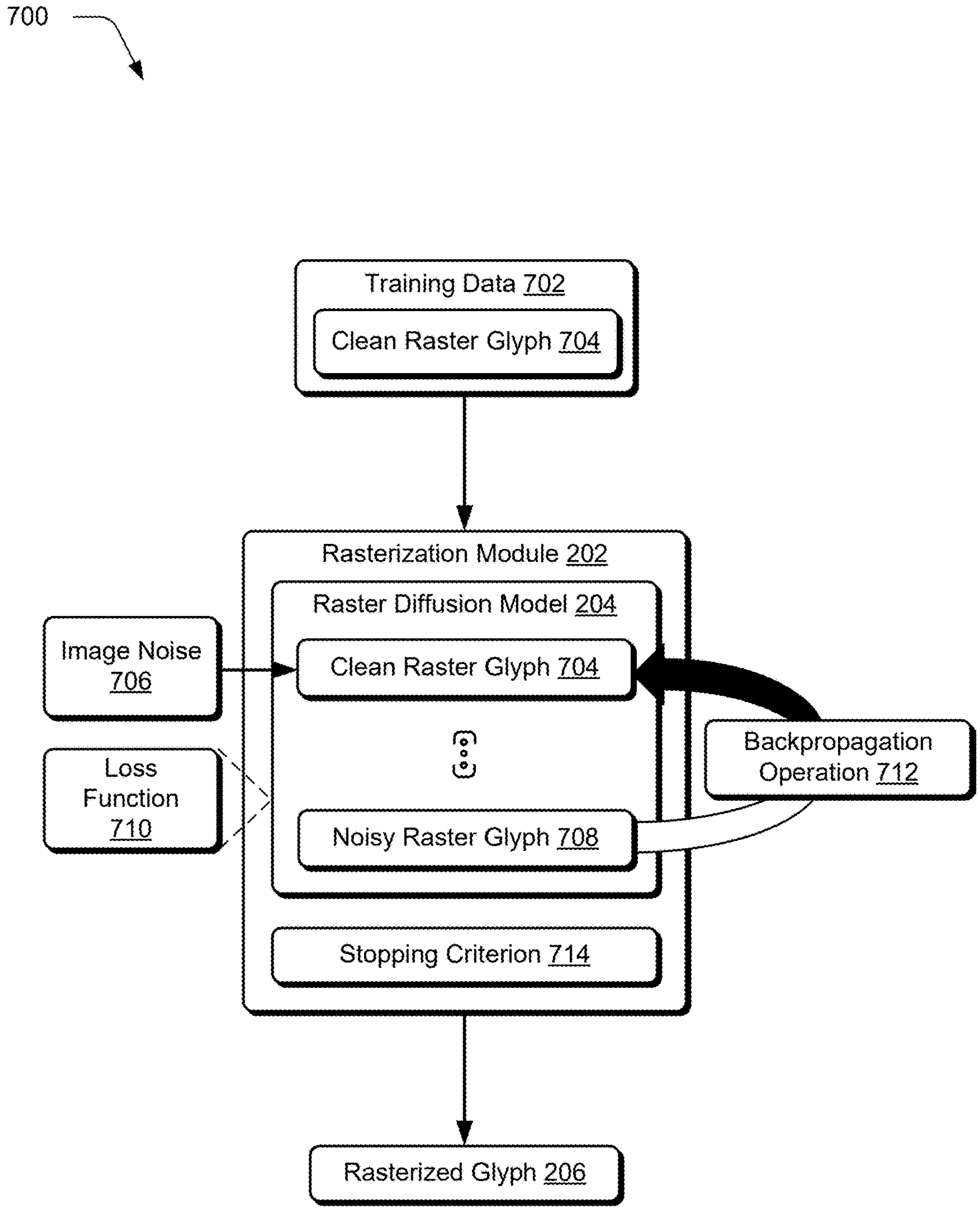
FIG. 7 depicts a system in an example implementation showing training of a raster diffusion model in greater detail.

FIG. 7 depicts a system 700 in an example implementation showing training of a raster diffusion model 204 in greater detail. The raster diffusion model 204 is illustrated as implemented as part of the rasterization module 202. The rasterization module 202 is representative of functionality to generate training data 702, use the training data 702 to train the raster diffusion model 204, and/or use the trained raster diffusion model as implementing the functionality described herein.

As described herein, the raster diffusion model 204 is representative of a machine-learning model, which refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, and so forth. The raster diffusion model 204 is a machine-learning model configured using a plurality of layers. The plurality of layers are configurable to include an input layer, an output layer, and one or more hidden layers. Calculations are performed involving noise diffusion and pixel generation within the layers via hidden states through a system of weighted connections that are "learned" during training of the raster diffusion model 204 to output a rasterized glyph 206 conditioned on embeddings of the training data 702.

As noted above, to train the raster diffusion model 204, training data 702 is received that provides examples of "what is to be learned" by the raster diffusion model 204 (i.e., as a basis to learn how a glyph is formed from random vector input). During training, a clean raster glyph 704 is input to the raster diffusion model 204. For example, the clean raster glyph 704 is a glyph from a pre-existing glyph database. Image noise 706, including Gaussian noise in some examples, is incorporated into pixels of the clean raster glyph 704, resulting in a noisy raster glyph 708. The raster diffusion model 204 then predicts correspondences between patterns depicted in pixels of the noisy raster glyph 708 and the clean raster glyph 704.

Training of the raster diffusion model 204 includes calculating a loss function 710 to quantify a loss associated with operations performed by the raster diffusion model 204. Calculating the loss function 710, for instance, includes comparing a difference between the noisy raster glyph 708 and the clean raster glyph 704, which is a ground truth. The loss function 710 is configurable in a variety of ways, examples of which include regret, Quadratic loss function as part of a least squares technique, perceptual loss using a pre-trained convolutional neural network, and so forth.

For example, the raster diffusion model 204 is trained to approximate an optimal denoiser under the condition that the glyphs $x_1, x_2, \ldots x_T$ are created by progressively adding Gaussian noise to the glyph of the previous step using the following equation:

$$q(x_t \mid x_{t-1}) = N\left(x_t; \sqrt{1-\beta_t}\, x_{t-1}, \beta_t I\right)$$

where $\beta_t$ represents the variance of the Gaussian noise added at each step. The glyph $x_T$ converges to a unit Gaussian distribution as $T \rightarrow \infty$. The denoiser network is trained with the training objective $\|\epsilon(x_t, t, f, g) - \epsilon\|^2$, representing the mean-squared error loss between the added training noise $\epsilon$ at each step and the predicted noise $\epsilon$(xt, t, f, g) from the network. Given sampled unit Gaussian noise from $x_T$, the glyph's codepoint embedding g and the font style embedding f, the raster diffusion model 204 is applied in T steps.

Calculating the loss function 710 also includes use of a backpropagation operation 712 as part of minimizing the loss function 710 and thereby training parameters of the raster diffusion model 204. Minimizing the loss function 710, for instance, includes adjusting weights corresponding to the image noise 706 to minimize the loss and thereby optimize performance of the raster diffusion model 204. The adjustment is determined by computing a gradient of the loss function 710, which indicates a direction to be used in order to adjust the parameters to minimize the loss. The parameters of the raster diffusion model 204 are then updated based on the computed gradient.

This process of training the raster diffusion model 204 continues over a plurality of iterations in an example until satisfying one or more stopping criterion 714. The stopping criterion 714 is employed by the rasterization module 202 in this example to reduce overfitting of the raster diffusion model 204, reduce computational resource consumption, and promote an ability of the raster diffusion model 204 to address previously unseen data (e.g., data that is not included specifically as an example in the training data 702). Examples of a stopping criterion 714 include but are not limited to a predefined number of epochs, validation loss stabilization, achievement of a performance improvement threshold, or based on performance metrics such as precision and recall. In this example, the backpropagation operation 712 continues training the raster diffusion model 204 until the noisy raster glyph 708 converges with the clean raster glyph 704.

Figure 8:
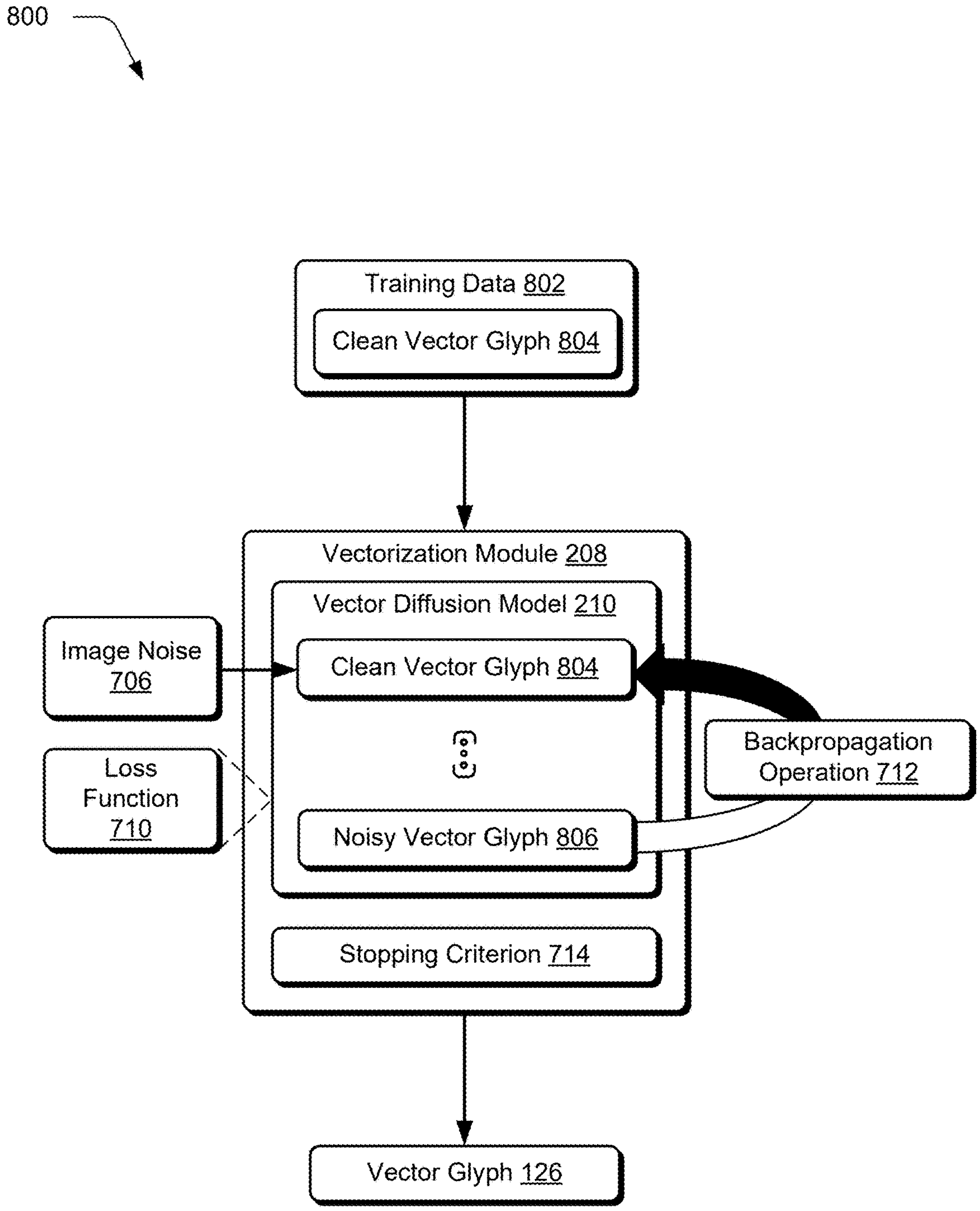
FIG. 8 depicts a system in an example implementation showing training of a vector diffusion model in greater detail.

FIG. 8 depicts a system 800 in an example implementation showing training of a vector diffusion model in greater detail. The vector diffusion model 210 is illustrated as implemented as part of the vectorization module 208. The vectorization module 208 is representative of functionality to generate training data 802, use the training data 802 to train the vector diffusion model 210, and/or use the trained vector diffusion model as implementing the functionality described herein.

As described herein, the vector diffusion model 210 is representative of a machine-learning model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, and so forth. The vector diffusion model 210 is a machine-learning model configured using a plurality of layers. The plurality of layers are configurable to include an input layer, an output layer, and one or more hidden layers. Calculations are performed involving noise diffusion and pixel generation within the layers via hidden states through a system of weighted connections that are "learned" during training of the vector diffusion model 210 to output a vector glyph 126 conditioned on the rasterized glyph 206.

As noted above, to train the vector diffusion model 210, training data 802 is received by the vector diffusion model 210 (i.e., as a basis to learn how a vector glyph is formed from random vector input). During training, a clean vector glyph 804 is input to the vector diffusion model 210. In some examples, the raster diffusion model 204 and the vector diffusion model 210 are trained concurrently. For example, the vectorization module 208 vectorizes the rasterized glyph 206 output from the rasterization module 202 for input to the vector diffusion model 210. Image noise 706, including Gaussian noise in some examples, is incorporated into pixels of the clean vector glyph 804, resulting in a noisy vector glyph 806. The vector diffusion model 210 then predicts correspondences between patterns depicted in pixels of the noisy vector glyph 806 and the clean vector glyph 804.

Training of the vector diffusion model 210 includes calculating a loss function 710 to quantify a loss associated with operations performed by the vector diffusion model 210. Calculating the loss function 710, for instance, includes comparing a difference between the noisy vector glyph 806 and the clean vector glyph 804, which is aground truth. The loss function 710 is configurable in a variety of ways, examples of which include regret, Quadratic loss function as part of a least squares technique, perceptual loss using a pre-trained convolutional neural network, and so forth. For example, the vector diffusion model 210 is trained according to a mean-squared error loss between training noise and predicted at sampled time steps: $\|\epsilon(y_t, x_0, t) - \epsilon\|^2$, representing the mean-squared error loss between the added training noise $\epsilon$ at each step and the predicted noise $\epsilon$(xt, t, f, g) from the network.

Calculating the loss function 710 also includes use of a backpropagation operation 712 as part of minimizing the loss function 710 and thereby training parameters of the vector diffusion model 210. Minimizing the loss function 710, for instance, includes adjusting weights corresponding to the image noise 706 to minimize the loss and thereby optimize performance of the vector diffusion model 210. The adjustment is determined by computing a gradient of the loss function 710, which indicates a direction to be used in order to adjust the parameters to minimize the loss. The parameters of the vector diffusion model 210 are then updated based on the computed gradient.

This process of training the vector diffusion model 210 continues over a plurality of iterations in an example until satisfying one or more stopping criterion 714. The stopping criterion 714 is employed by the vectorization module 208 in this example to reduce overfitting of the vector diffusion model 210, reduce computational resource consumption, and promote an ability of the vector diffusion model 210 to address previously unseen data (e.g., data that is not included specifically as an example in the training data 802). Examples of a stopping criterion 714 include but are not limited to a predefined number of epochs, validation loss stabilization, achievement of a performance improvement threshold, or based on performance metrics such as precision and recall. In this example, the backpropagation operation 712 continues training the vector diffusion model 210 until the noisy vector glyph 806 converges with the clean vector glyph 804.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6.

Figure 9:
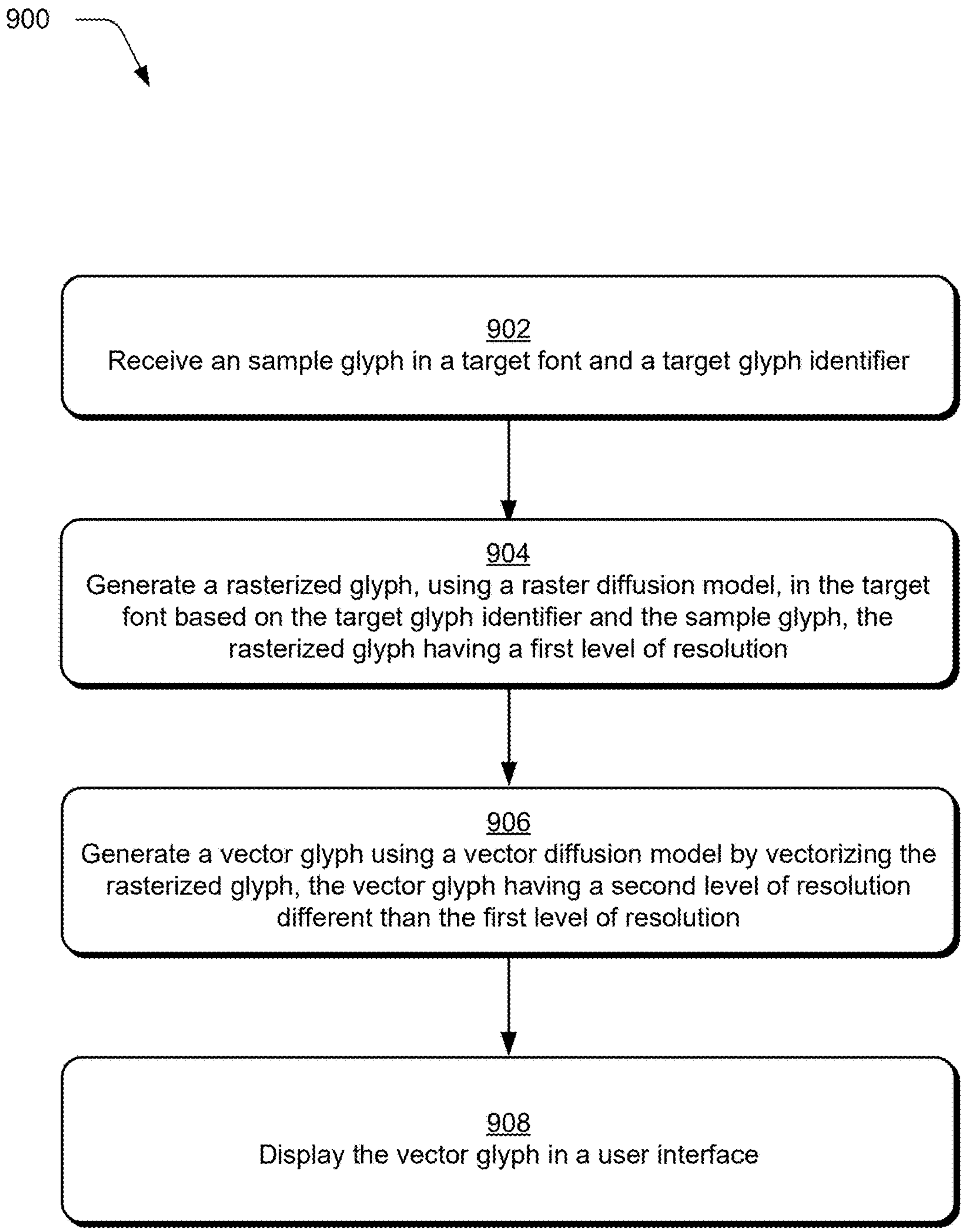
FIG. 9 depicts a procedure in an example implementation of vector font generation based on cascaded diffusion.

FIG. 9 depicts a procedure 900 in an example implementation of vector font generation based on cascaded diffusion. At block 902, a sample glyph in a target font 122 and a target glyph identifier are received.

At block 904, a rasterized glyph 206 is generated using a raster diffusion model 204 in the target font 122 based on the target glyph identifier and the sample glyph, the rasterized glyph 206 having a first level of resolution. For example, the generating the rasterized glyph 206 using the raster diffusion model 204 includes extracting embeddings from the sample glyph in the target font and the target glyph identifier. Additionally or alternatively, the rasterized glyph 206 captures a shape and a style of the sample glyph in the target font 122.

At block 906 a vector glyph 126 is generated using a vector diffusion model 210 by vectorizing the rasterized glyph 206, the vector glyph 126 having a second level of resolution different than the first level of resolution. For example, the vector glyph 126 includes an ordered sequence of control points using one or more cubic Bezier curve paths based on one or more locations of control points of the rasterized glyph 206. For example, the generating the vector glyph using the vector diffusion model 210 includes synthesizing the vector glyph conditioned on the rasterized glyph. In some examples, the generating the vector glyph using the vector diffusion model 210 includes determining a curve of the vector glyph 126 based on the raster glyph by generating a target tensor that represents the curve of the vector glyph 126 in a vector graphics format. Additionally or alternatively, the generating the vector glyph 126 using the vector diffusion model 210 includes upsampling the rasterized glyph 206. In some examples, the generating the vector glyph 126 using the vector diffusion model 210 includes predicting locations for one or more control points that form a curve of the vector glyph 126.

At block 908, the vector glyph 126 is displayed in a user interface 110.

Figure 10:
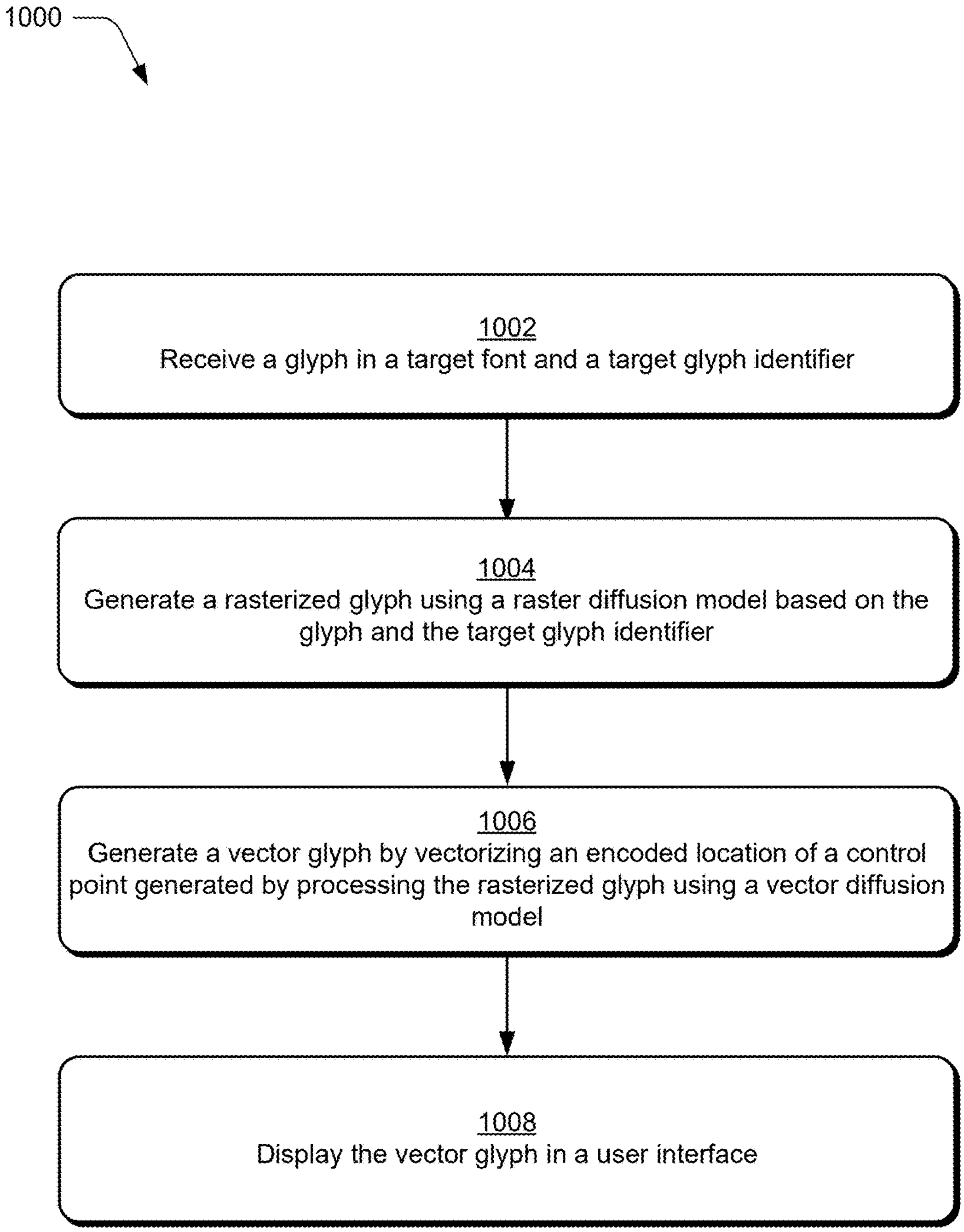
FIG. 10 depicts a procedure in an additional example implementation of vector font generation based on cascaded diffusion.

FIG. 10 depicts a procedure 1000 in an additional example implementation of vector font generation based on cascaded diffusion. At block 1002, a glyph in a target font 122 and a target glyph identifier are received.

At block 1004, a rasterized glyph 206 is generated using a raster diffusion model 204 based on the glyph and the target glyph identifier. For example, the raster diffusion model 204 is configured to extract embeddings from the glyph and the target glyph identifier. Additionally or alternatively, the raster diffusion model 204 is configured to generate the rasterized glyph 206 as conditioned based on the embedding. In some examples, the rasterized glyph 206 captures a shape and a style of the target glyph identifier in the target font 122.

At block 1006, a vector glyph 126 is generated by vectorizing an encoded location of a control point generated by processing the rasterized glyph 206 using a vector diffusion model 210. For example, the vector diffusion model 210 is configured to synthesize the vector glyph 126 as conditioned based on the rasterized glyph 206. In some examples, the vector diffusion model 210 determines curves of the vector glyph 126. Additionally or alternatively, the vector diffusion model 210 is configured to determine a curve of the vector glyph 126 based on the rasterized glyph 206 and generate a target tensor that represents the curve of the vector glyph 126 in a vector graphics format. For example, the vector diffusion model 210 is configured to upsample the rasterized glyph 206.

At block 1008, the vector glyph 126 is displayed in a user interface 110.

Example System and Device

Figure 11:
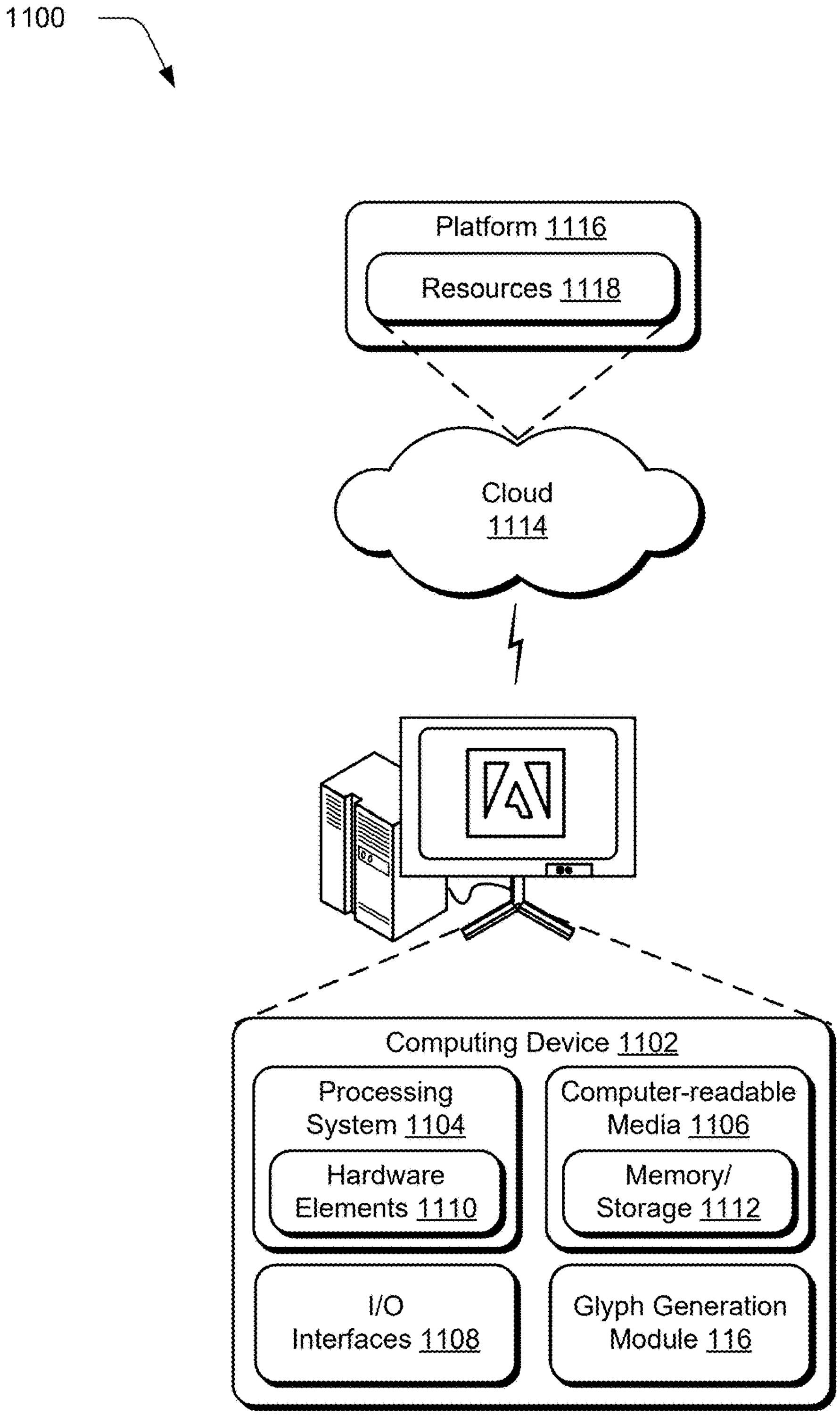
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 900 that includes an example computing device 1102 that is representative of one or more computing systems and/or devices that implement the various techniques described herein. This is illustrated through inclusion of the glyph generation module 116. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its glyphs set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices and/or processing systems 1104) to implement techniques, modules, and examples described herein.

The techniques described herein are supported by various configurations of the computing device 1102 and are not limited to the specific examples of the techniques described herein. This functionality is also implementable through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized when computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

What is claimed is:

1. A method comprising:

receiving, by a processing device, a sample glyph in a target font and a target glyph identifier;

generating, by the processing device using a raster diffusion model, a rasterized glyph in the target font based on the target glyph identifier and the sample glyph, the rasterized glyph having a first level of resolution;

generating, by the processing device using a vector diffusion model, a vector glyph by vectorizing the rasterized glyph, the vector glyph having a second level of resolution different than the first level of resolution; and displaying, by the processing device, the vector glyph in a user interface.

2. The method of claim 1, wherein the vector glyph includes an ordered sequence of control points using one or more cubic Bezier curve paths based on one or more locations of control points of the rasterized glyph.

3. The method of claim 1, wherein the generating the rasterized glyph using the raster diffusion model includes extracting embeddings from the sample glyph in the target font and the target glyph identifier.

4. The method of claim 3, wherein the generating of the rasterized glyph by the raster diffusion model is conditioned on the embeddings.

5. The method of claim 1, wherein the generating the vector glyph using the vector diffusion model includes synthesizing the vector glyph conditioned on the rasterized glyph.

6. The method of claim 5, wherein the generating the vector glyph using the vector diffusion model includes determining a curve of the vector glyph based on the raster glyph by generating a target tensor that represents the curve of the vector glyph in a vector graphics format.

7. The method of claim 5, wherein the generating the vector glyph using the vector diffusion model includes upsampling the rasterized glyph.

8. The method of claim 5, wherein the generating the vector glyph using the vector diffusion model includes predicting locations for one or more control points that form a curve of the vector glyph.

9. The method of claim 1, wherein the rasterized glyph captures a shape and a style of the sample glyph in the target font.

10. A system comprising:

a memory component; and a processing device coupled to the memory component, the processing device to perform operations comprising:

receiving a glyph in a target font and a target glyph identifier;

generating a rasterized glyph using a raster diffusion model based on the glyph and the target glyph identifier;

generating a vector glyph by vectorizing an encoded location of a control point generated by processing the rasterized glyph using a vector diffusion model; and displaying the vector glyph in a user interface.

11. The system of claim 10, wherein the raster diffusion model is configured to extract embeddings from the glyph and the target glyph identifier.

12. The system of claim 11, wherein the raster diffusion model is configured to generate the rasterized glyph as conditioned based on the embedding.

13. The system of claim 10, wherein the vector diffusion model is configured to synthesize the vector glyph as conditioned based on the rasterized glyph.

14. The system of claim 13, wherein the vector diffusion model is configured to determine a curve of the vector glyph based on the rasterized glyph and generate a target tensor that represents the curve of the vector glyph in a vector graphics format.

15. The system of claim 13, wherein the vector diffusion model is configured to upsample the rasterized glyph.

16. The system of claim 10, wherein the rasterized glyph captures a shape and a style of the target glyph identifier in the target font.

17. A non-transitory computer-readable storage medium storing executable instructions, which when executed by a processing device, cause the processing device to perform operations comprising:

receiving a glyph in a target font and a target glyph identifier;

generating a rasterized glyph by encoding information from the target glyph identifier and the glyph in the target font in a pixel space using a raster diffusion model; and generating a vector glyph by vectorizing the rasterized glyph using a vector diffusion model.

18. The non-transitory computer-readable storage medium of claim 17, wherein the raster diffusion model is configured to extract embeddings from the glyph in the target font and target glyph identifier and generates the rasterized glyph conditioned on the embeddings.

19. The non-transitory computer-readable storage medium of claim 17, wherein the vector diffusion model is configured to synthesize the vector glyph conditioned on the rasterized glyph by upsampling the rasterized glyph.

20. The non-transitory computer-readable storage medium of claim 19, wherein the vector diffusion model is configured to predict a location for a control point that forms a curve of the vector glyph.

* * * * *